United States Patent
Woodall

(10) Patent No.: US 10,363,858 B1
(45) Date of Patent: Jul. 30, 2019

(54) DEPLOYABLE AMPHIBIOUS RUNWAY

(71) Applicant: Robert Woodall, Panama City, FL (US)

(72) Inventor: Robert Woodall, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 172 days.

(21) Appl. No.: 15/670,461

(22) Filed: Aug. 7, 2017

(51) Int. Cl.
| | |
|---|---|
| *B60P 3/06* | (2006.01) |
| *B60P 3/08* | (2006.01) |
| *B60P 1/43* | (2006.01) |
| *B60P 1/44* | (2006.01) |
| *B60P 3/10* | (2006.01) |
| *B60P 3/11* | (2006.01) |
| *B60V 1/18* | (2006.01) |
| *B60V 3/06* | (2006.01) |
| *B60V 1/16* | (2006.01) |
| *B63B 35/00* | (2006.01) |
| *B64C 39/02* | (2006.01) |
| *B63G 8/00* | (2006.01) |

(52) U.S. Cl.
CPC .............. *B60P 3/06* (2013.01); *B60P 1/431* (2013.01); *B60P 1/44* (2013.01); *B60P 3/08* (2013.01); *B60P 3/10* (2013.01); *B60P 3/11* (2013.01); *B60V 1/16* (2013.01); *B60V 1/18* (2013.01); *B60V 3/06* (2013.01); *B63B 2035/006* (2013.01); *B63G 2008/002* (2013.01); *B64C 39/024* (2013.01); *B64C 2201/205* (2013.01)

(58) Field of Classification Search
CPC .... B60P 3/06; B60P 1/431; B60P 1/44; B60P 3/08; B60P 3/10; B60P 3/11; B60V 1/16; B60V 1/18; B60V 3/06; B63B 2035/006; B63B 35/50; B63G 2008/002; B64C 39/024
See application file for complete search history.

(56) References Cited

U.S. PATENT DOCUMENTS

| | | | | |
|---|---|---|---|---|
| 3,322,223 | A * | 5/1967 | Bertelsen | B60V 1/08 180/120 |
| 3,677,212 | A * | 7/1972 | Gregoire | B63G 8/00 114/316 |
| 3,810,522 | A * | 5/1974 | Morgan | B60V 3/02 180/116 |
| 3,858,541 | A * | 1/1975 | Metcalf, Jr. | B63B 7/02 114/249 |

(Continued)

*Primary Examiner* — Kevin Hurley
*Assistant Examiner* — Marlon A Arce
(74) *Attorney, Agent, or Firm* — James T. Shepherd

(57) ABSTRACT

A vehicle is provided for drone stowage and transport as a means to extend the range of smaller drones and unmanned underwater vehicles. The transport vehicle is launched from a mother ship and provides for moving drones and underwater unmanned vehicles to desired launch and recovery points. The vehicle is based on current hovercraft vehicles and is adapted for stowage of drones while remaining compatible with existing mother ships. The vehicle includes foldable deck sections, which can be extended to provide launching and landing runways for flying drones. Lifts and ramps are incorporated for loading, launching and recovering flying drones, floating drone vessels and underwater unmanned vehicle drones.

9 Claims, 3 Drawing Sheets

(56) References Cited

U.S. PATENT DOCUMENTS

| | | | | | |
|---|---|---|---|---|---|
| 4,858,943 | A | * | 8/1989 | Cote | B60P 3/1075 |
| | | | | | 280/414.1 |
| 5,617,810 | A | * | 4/1997 | Sauerwein | B63B 7/04 |
| | | | | | 114/123 |
| 6,334,402 | B1 | * | 1/2002 | Gilligan | B63B 7/082 |
| | | | | | 114/345 |
| 6,840,825 | B1 | * | 1/2005 | Messano | B60F 3/0007 |
| | | | | | 114/290 |
| 2014/0165893 | A1 | * | 6/2014 | O'Neal | B63B 1/14 |
| | | | | | 114/61.15 |

* cited by examiner

DEPLOYABLE AMPHIBIOUS RUNWAY

STATEMENT OF GOVERNMENT INTEREST

The invention described herein may be manufactured and used by or for the Government of the United States of America for governmental purposes without the payment of any royalties.

BACKGROUND OF THE INVENTION

(1) Field of the Invention

The present invention relates to amphibious vehicles. More particularly, the present invention relates to an air-cushion vehicle with an integrated, extensible runway for both transporting drones and providing for sea and land based launching and recovery of the drones.

(2) Description of the Prior Art

Current, state of the art military operations often require more rapid response and the use of advanced drone based technologies, including flying drones, surface or floating drone vessels and unmanned underwater vehicles (uuv's). While the command and control operation of a drone generally can be greatly separated from the drone itself, the range of the drone is limited by its fuel capacity.

Many drone operations are based well out at sea on large mother ships. While this remains an effective way to launch and recover drones, the usefulness of smaller, less expensive drones is effectively limited due to their lesser fuel capacity. For example, smaller drones typically cannot be used to reach objectives further inland from sea based platforms.

Hovercrafts have been successfully used for transport from a mother ship stationed at sea to land-based operations. In addition to beach landing, such craft provide personnel transport, evacuation support, mine countermeasure operations, and special equipment delivery. In all, these crafts provide the capability to launch amphibious operations from distant points over the horizon. However, current hovercrafts are not equipped or configured for drone operations.

Thus, a need has been recognized in the state of the art to develop an effective means to extend the range of smaller sea-based drones and uuv's. In addition, there is a need to provide a rapid means of moving drones and uuv's to desired launch and recovery points. The means needs to be compatible with existing mother ships and provide stowage for flying drones and uuv's as well as decks and runways for launching and landing flying drones.

SUMMARY OF THE INVENTION

It is therefore a general purpose and primary object of the present invention to provide a drone stowage and transport means to extend the range of smaller drones and unmanned underwater vehicles (uuv's). A transport vehicle is launched from a mother ship and provides a means of moving drones and uuv's to desired launch and recovery points. The vehicle includes foldable deck sections, which can be extended to provide launching and landing runways for flying drones. Lifts and ramps are incorporated for loading, launching and recovering floating drone vessels and uuv's.

The vehicle is based on current hovercraft vehicles and is adapted for stowage of drones while remaining compatible with existing mother ships. A barge type buoyancy box can be fitted with underside landing rails similar to current naval landing craft and can serve as the base from which other components of the drone transport craft can be fixed upon. Multiple watertight compartments can be apportioned in the buoyancy box such that multiple compartment failures would be necessary in order for the barge buoyancy box base to lose buoyancy to the point of endangering the craft.

A flexible rubber skirt can be fitted around the circumference of the buoyancy box via a clamping mechanism. The skirt can consist of numerous segments and air passages that entrain air under the craft. Upon the buoyancy box, upper and lower decking and stiffener material can be attached. Pass through openings can be left in the buoyancy box to allow for air to pass through from above.

Lift fans can push air through the openings and into the rubber skirt such that the craft can be lifted off the ground or water surface by the air pressure inside the skirt. This effect significantly reduces the drag and friction upon the hull such that forward propulsive forces created by propellers and bow thrusters easily move the craft to progressively higher speeds in any direction. The lower portion of the rubber skirt can include sacrificial rubber fingers that can be replaced after ground abrasion has eroded them away over time.

Walls fabricated of corrosion resistant materials can be constructed within the buoyancy box to form drone stowage areas, repair work areas, operating equipment rooms and operator control rooms. The walls can be fitted with air-intake areas to supply fresh air to engines, propellers, lift fans, bow thrusters and to personnel areas. Windows can be provided for forward and side observations by the operator of the craft. Cameras can also be deployed to provide the operator views of other areas of the craft, such as upper deck launch and recovery areas, repair areas and stowage areas.

Once external walls are constructed, the main landing deck section can be placed onto the craft. Based on dimensions of current landing craft, the main landing deck section can be in the range of 250 feet long by 50 feet wide. The decking can be fabricated of high strength aluminum in a beam construction configuration and can include corrosion resistant plating on its upper surface. The plating can be covered with various protective coatings both corrosion-abrasion resistant as well as thermal management coatings.

Additionally, foldable deck sections can be attached to the main deck via hinges to increase the deck area and/or extend the length of the runway. The sections can be singular sections attached to the main deck or can be multiple folding sections attached to one another with at least one section attached to the main deck. In this manner, multiple deck configurations are possible. With multiple, hinged, deck sections, the size of the launch and landing area is limited only by material strength and available engine lift.

For ease in handling the drones and other equipment, various lifts, elevators and the like can be integrated into the deck to raise and lower stowed drones from the cargo area onto the flight deck and for moving and configuring other equipment. The folding deck sections can have integrated support flanges at the fold lines to reinforce deck strength and each can be operated by integrating hydraulic control arms. Hydraulic control can also provide known sliding rod and keyhole type sectional locking mechanisms for additional support.

In one embodiment, a drone operations craft includes upper deck sections and sets of hinges attached adjacent an outer perimeter of the craft. The upper deck sections are rotatable about the hinges so as to rotate from a folded position to an extended position, which increases the total deck area of the craft.

Flanges are positioned between the upper deck sections in the extended position and an outer wall of the craft. The flanges support the upper deck sections when in the extended position. The flanges can be affixed to the upper deck sections and rest against the outer wall, or the flanges can be affixed to the outer wall and the upper deck sections can rest against the flanges.

The craft can accommodate drone stowage beneath the upper deck sections. The craft can include an under deck extending between the outer walls of the craft. The under decking can support the upper deck sections when the upper deck sections are in the folded position.

In one embodiment, one of the upper deck sections can include a set of additional hinges affixed at an end of the upper deck section distant from the other hinges. An additional deck section can be rotatable about the set of additional hinges so as to rotate from a folded position congruent to the upper deck section to an extended position further increasing the total deck area of the craft. The craft can be a hovercraft and the hovercraft can be compatible with at sea operations of a mother ship.

In one embodiment, a drone stowage and transport system includes a hovercraft vessel, with sets of hinges attached about its upper perimeter. Upper deck sections are rotatable about the hinges so as to rotate from a folded position to an extended position increasing the total deck area of the vessel.

The system can include flanges positioned between the upper deck sections and the outer walls of the vessel, such that the flanges support the upper deck sections when they are in the extended position. One of the upper deck sections can include a set of additional hinges affixed at an end of the upper deck section distant from the other hinges.

The additional deck section can be rotatable about the additional hinges so as to rotate from a folded position congruent to the upper deck section to an extended position further increasing the total deck area of the vessel. The vessel can include an under deck extending between the outer walls of said vessel. The under decking can support the upper deck sections when the upper deck sections are in the folded position.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE INVENTION

Figure 1:
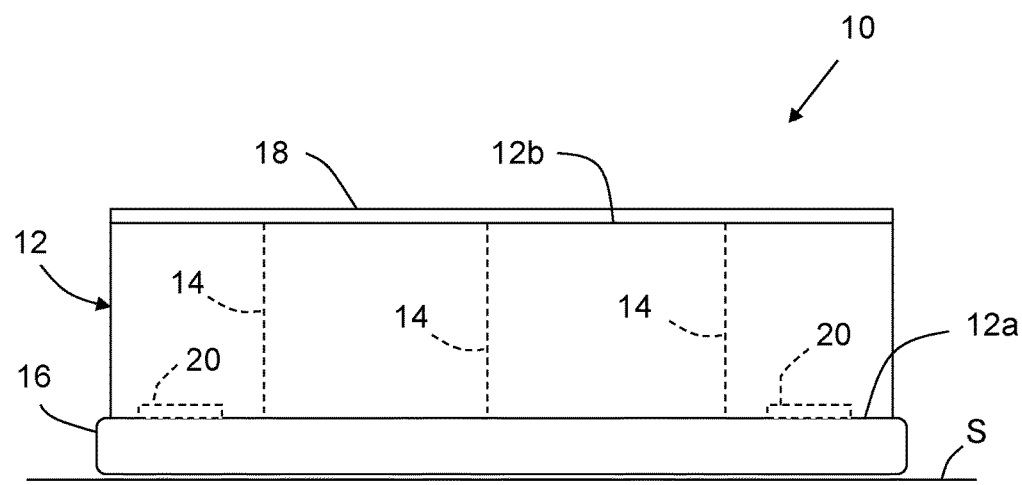
FIG. 1 illustrates a schematic side view of a drone stowage and transport vehicle.

Referring now to FIG. 1, there is shown a schematic side view of craft 10. Barge type buoyancy box 12 serves as the base for craft 10 upon which other components are fixed. Multiple watertight compartments (indicated by dashed lines 14 in FIG. 1) are apportioned in buoyancy box 12 such that multiple compartment failures would be necessary in order for barge buoyancy box 12 to lose buoyancy to the point of endangering craft 10.

Flexible rubber skirt 16 is affixed about bottom portion 12a of buoyancy box 12. Skirt 16 consists of numerous segments and air passages (not shown in FIG. 1) that entrain air under craft 10 as is well known in the art. Upper decking 18 is attached about upper portion 12b of buoyancy box 12. Pass through openings 20 are left in buoyancy box 12 to allow for air to pass through from above into skirt 16.

Figure 2:
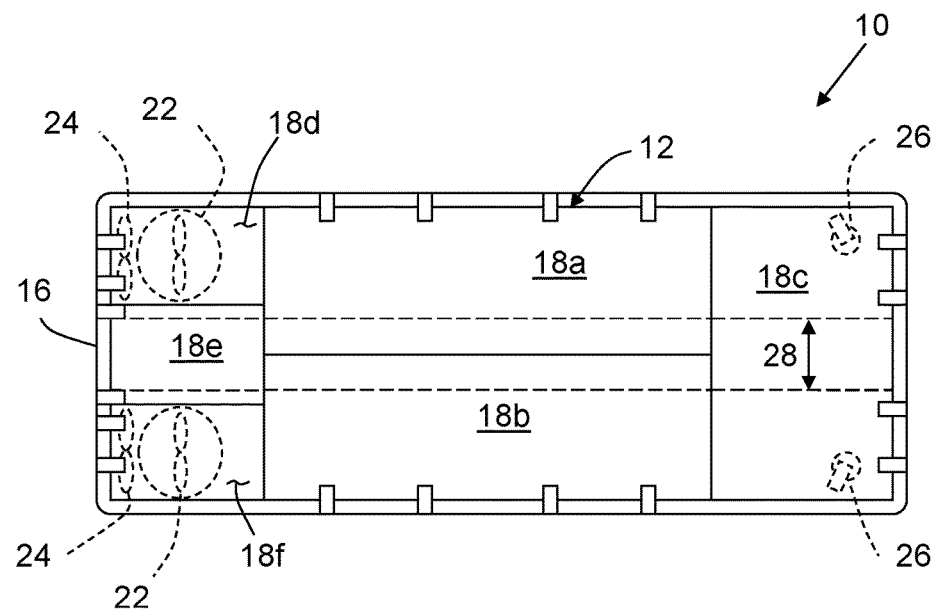
FIG. 2 illustrates a schematic top view of the vehicle of FIG. 1.

Referring additionally to FIG. 2, there is shown a schematic top view of craft 10. Lift fans 22 push air through openings 20 and into skirt 16 such that the air pressure of the air entrained inside skirt 16 will lift craft 10 up off ground or water surface S. As is known to those of skill in the art, this effect significantly reduces the drag and friction upon craft 10 such that propulsive forces created by propellers 24 and thrusters 26 can easily move craft 10 in any direction.

As shown in FIG. 2, upper decking 18 can be partitioned into a number of areas, designated 18a through 18f. Upper decking 18 can incorporate runway area 28 marked on decking 18 by dashed lines. Additionally, drone stowage, handling and repair can be accommodated beneath upper decking 18. Further, crew and operator control functions can also be incorporated beneath upper decking 18. Lifts and ramps can be incorporated beneath upper decking 18 for loading, launching and recovering drones.

Figure 3:
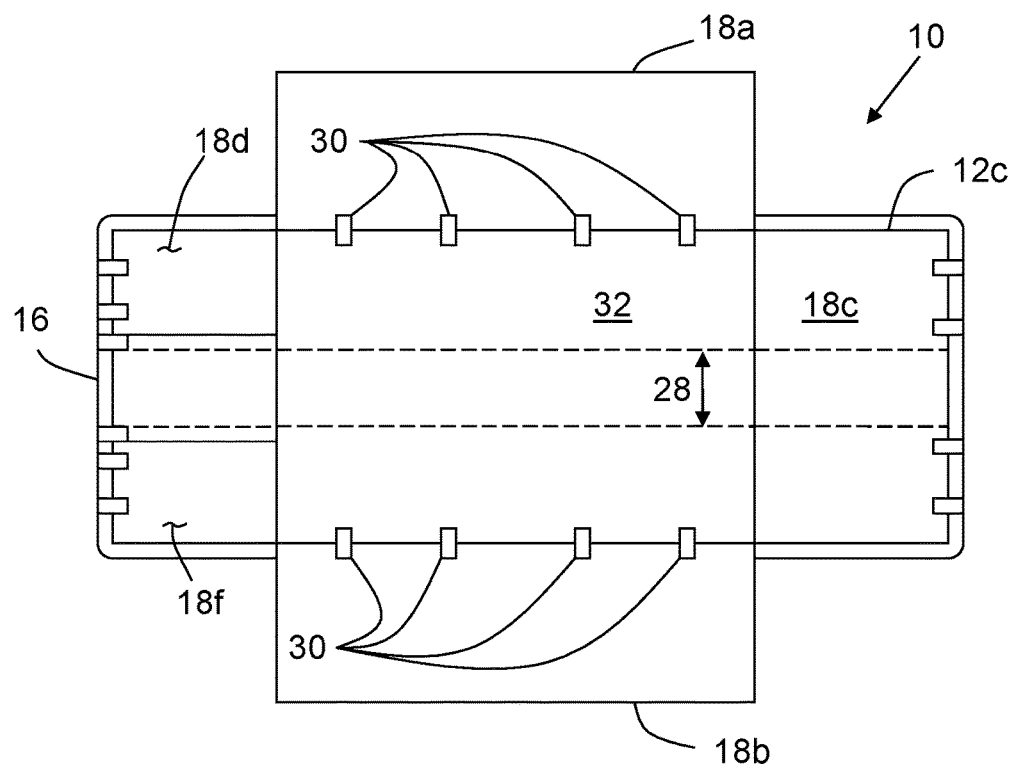
FIG. 3 shows a schematic top view of the vehicle of FIG. 1, with extended decking.

Referring now to FIG. 3, there is shown a schematic top view of craft 10, wherein buoyancy box 12 has an outer perimeter 12c defined in its upper portion 12b and deck sections 18a and 18b have been rotated about hinges 30 to extend beyond outer perimeter 12c. Under deck 32 extends beneath upper deck 18 and can support upper deck 18 when deck 18 is in the closed position shown in FIG. 2. Under deck 32 also includes runway area 28 marked on under decking 32 by dashed lines. Hinges 30 are positioned so as to maintain runway area 28 clear of obstructions.

Figure 4:
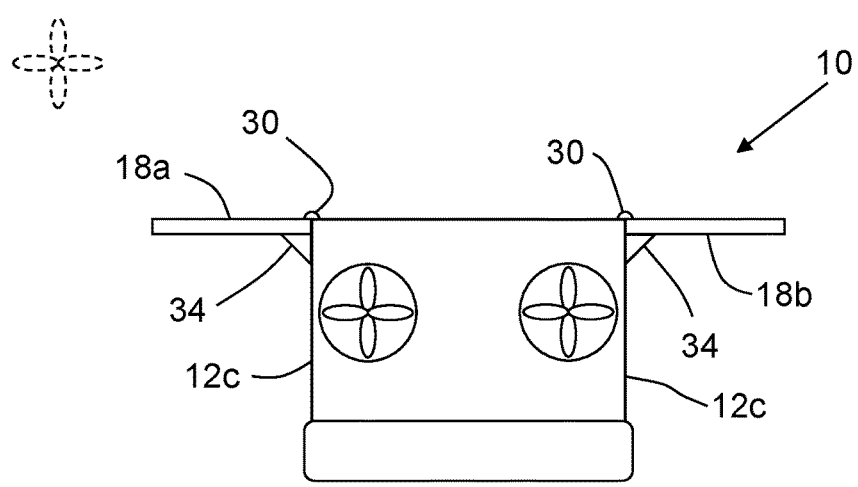
FIG. 4 shows a schematic rear view of the vehicle of FIG. 3.

Referring now to FIG. 4, there is shown a schematic rear view of craft 10, with decks 18a and 18b extended, as in FIG. 3. When extended, upper deck sections 18a and 18b can be supported by integrated support flanges 34 attached to sections 18a and 18b adjacent hinges 30. (For clarity, but not limitation, flanges 34 are not shown in FIG. 2 and FIG. 3.) As in the case of hinges 30, support flanges 34 are positioned to maintain runway area 28 (shown in FIG. 2 and FIG. 3) clear of obstructions. Support flanges 34 rest against outer walls 12c of craft 10 when the upper deck sections 18a and 18b are extended as shown in FIG. 4.

Figure 5:
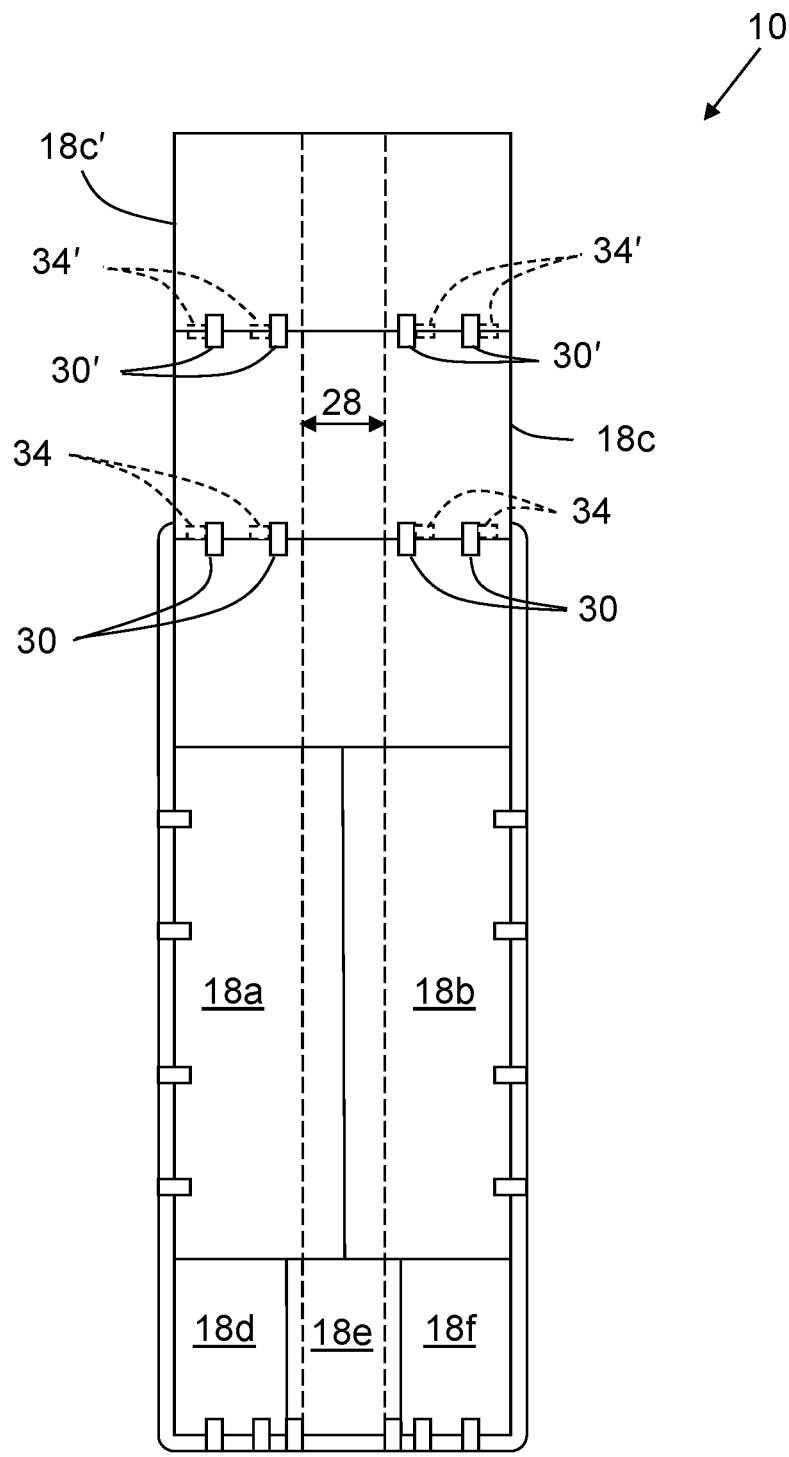
FIG. 5 shows a schematic top view of the vehicle of FIG. 1, with additional extended decking.

Referring now to FIG. 5, there is shown a schematic top view of craft 10, wherein upper deck section 18c is extended in the same manner shown in FIG. 3 for upper deck sections 18a and 18b. As in the case of upper deck sections 18a and 18b in FIG. 4, upper deck section 18c has been rotated about hinges 30 and is supported by support flanges 34 (shown in phantom in FIG. 5).

To provide additional surface for launch and recovery of drones, upper deck section 18c can include additional folding deck section 18c'. To configure folding deck section 18c' in the extended position shown in FIG. 5, folding deck section 18c' has been rotated about hinges 30'. Folding deck section 18c' can be supported by additional supports or flanges 34' (shown in phantom in FIG. 5). As in the case of hinges 30 and support flanges 34, hinges 30' and additional flanges 34' are positioned to maintain runway area 28 clear of obstructions.

What has thus been described is a craft providing drone stowage and transport means to extend the range of smaller drones, including flying drones, floating drone vessels and unmanned underwater vehicles (uuv's). The craft is based on current hovercraft vehicles and is adapted for stowage of drones while remaining compatible with existing mother ships. The craft can be launched from a mother ship and provides a means of moving drones to desired launch and recovery points. The craft includes foldable deck sections, which can be extended to provide launching and landing runways for flying drones. Lifts and ramps can be incorporated for loading, launching and recovering floating drone vessels and uuv's.

Generally, existing hovercraft are on the order of 250 feet long by 50 feet wide. Basing the dimensions of craft 10 on such vessels allows for a main launch and landing area (upper decking 18) of the same magnitude. The decking can be fabricated of high strength aluminum beams, or similar material, with thick corrosion resistant plating on top. The plating can be covered with various protective coatings including both corrosion-abrasion resistant as well as thermal management coatings. Standard markings for runway area 28 can be painted on top of these coatings.

The folding sections of upper decking 18 can be varied in size during fabrication, depending on the launch, landing and recovery needs of the planned drone operations. For example, sections 18*d*, 18*e* and 18*f* can be combined into a single section and can extend over 100 feet. Sections 18*a* and 18*b* can be eliminated to allow section 18*c* to also extend over 100 feet. When unfolded about their respective hinges, the total length of runway area 28 can be increased to over 450 feet. As can be seen, craft 10 can have multiple combinations of folding sections to accommodate multiple mission requirements.

Obviously, many modifications and variations of the present invention may become apparent in light of the above teachings. For example, support flanges 34 can be attached to outer walls 12*c* rather than being attached to upper deck sections 18*a* through 18*f*. When unfolded, upper deck sections 18*a* through 18*f* can rest on flanges 34. In an alternative configuration, hinges 30 can incorporate stops, which can prevent upper deck sections 18*a* through 18*f* from unfolding beyond the configuration shown in FIG. 4.

It can also be understood that spaces beneath under decking 32 can be arranged in any manner necessary to support the mission requirements, without limitation to the operations of the folding deck sections. This can include, again without limitation, drone stowage, handling and repair equipment, crew operations, propulsion and maneuvering equipment, and deck extension hydraulics or other extension means.

It will be understood that many additional changes in details, materials and arrangements of parts which have been described herein and illustrated in order to explain the nature of the invention, may be made by those skilled in the art within the principle and scope of the invention as expressed in the appended claims.

What is claimed is:

1. A drone stowage and transport vehicle, comprising:
    a hovercraft vessel having a barge type buoyancy box, said buoyancy box having an outer wall with an outer perimeter defined in an upper portion thereof;
    at least one upper deck section disposed on said upper portion of said outer wall; and
    a set of hinges attached to each said upper deck section and to said buoyancy box at said outer perimeter, wherein each said upper deck section is rotatable about said set of hinges from a folded position to an extended position increasing a total deck area of said vessel,
    wherein said at least one upper deck section further comprises a set of additional hinges affixed at an end of said at least one upper deck section distant from said at least one set of hinges, and at least one additional deck section rotatable about said set of additional hinges from a folded position congruent to said at least one upper deck section to an extended position further increasing said total deck area of said craft.

2. The vehicle of claim 1, further comprising flanges positioned between each said upper deck section in said extended position and said outer wall, said flanges supporting each said upper deck section while in said extended position.

3. The vehicle of claim 2, wherein said flanges are affixed to each said upper deck section and rest against said outer wall when said upper deck section is in said extended position.

4. The vehicle of claim 2, wherein said flanges are affixed to said outer wall and each said upper deck section rests against said flanges when in said extended position.

5. The vehicle of claim 2, wherein said buoyancy box includes a drone stowage area located beneath said at least one upper deck section.

6. The vehicle of claim 5, further comprising lifts and ramps disposed between said drone stowage area and said at least one upper deck section.

7. The vehicle of claim 2, further comprising an under deck disposed on said buoyancy box and supporting said at least one upper deck section when said at least one upper deck section is in said folded position.

8. The vehicle of claim 7, wherein said buoyancy box includes a drone stowage area located beneath said under deck.

9. The vehicle of claim 1, wherein said craft is configured to be transported within and deployed from a mother ship.

* * * * *